3,004,039
PREPARATION OF POLYHYDROPYRANYLAMINO AROMATIC COMPOUNDS
James J. Louvar, Riverside, Ill., assignor, by mesne assignments, to Universal Oil Products Company, Des Plaines, Ill., a corporation of Delaware
No Drawing. Filed Oct. 29, 1958, Ser. No. 770,563
13 Claims. (Cl. 260—345.1)

This invention relates to a method for preparing compounds possessing antioxidation properties and more particularly to a process for preparing polyhydropyranylamino aromatic compounds.

Various organic materials are subject to oxidative deterioration, such materials include motor fuel, particularly unsaturated gasolines as, for example, cracked gasoline and polymer gasolines, diesel oil, mineral oil, lubricating oil, fuel, drying oil, greases, rubber, monomers such as styrene, butadiene, etc., paraffin waxes, edible fats and oils, etc.

Among the edible fats and oils which may be of animal, vegetable and mineral origin and which tend to become rancid especially during long periods of storage prior to use are linseed oil, menhadin oil, cod liver oil, castor oil, olive oil, rapeseed oil, coconut oil, palm oil, corn oil, sesame oil, peanut oil, babassu oil, butter, fat, lard, beef tallow, etc., as well as the hydrogenated oils. It is to be understood that other oils and fats may be treated within the scope of the present invention including such oils and fats which may have been previously subjected to various treatments such as blowing with air, heat treatment, etc.

These materials are adversely effected by oxygen, with the resultant formation of undesirable gums, discoloration, rancidity or other deleterious reactions. Therefore, certain substances must be added to the aforementioned organic materials which act to stabilize such materials and thus delay or prevent the undesired reactions from occurring.

It is therefore an object of this invention to provide an additive which will stabilize organic compounds susceptible to oxidative deterioration.

Another object of this invention is to provide a method for preparing polyhydropyranylamino aromatic compounds which are capable of retarding the oxidative deterioration of organic substances.

One embodiment of this invention resides in a process for the preparation of a polyhydropyranylamino aromatic compound which comprises condensing an aromatic amine with a dihydropyran in the presence of a catalyst comprising a mercuric salt, and recovering the resultant polyhydropyranylamino aromatic compound.

Another embodiment of the invention is found in a process for the preparation of a polyhydropyranylamino aromatic compound which comprises condensing an aromatic amine with a dihydropyran in an inert organic diluent in the presence of a catalyst comprising a mercuric salt at a sub-atmospheric temperature, and recovering the resultant polyhydropyranylamino aromatic compound.

A specific embodiment of the invention resides in a process for the preparation of a polyhydropyranylamino aromatic compound which comprises condensing p-phenylenediamine with 2,3-dihydropyran in dioxane in the presence of mercuric acetate at a temperature in the range of from about 0° to about 20° C., and recovering the resultant N,N - di - (2 - tetrahydropyranyl) - p - phenylenediamine.

Other objects and embodiments referring to alternative aromatic amines and to alternative mercuric salts will be found in the following further detailed description of the invention.

As hereinbefore set forth it has now been discovered that polyhydropyranylamino aromatic compounds may be used to deter or prevent the oxidative deterioration of various organic materials, especially petroleum products such as greases, oils, etc. These polyhydropyranylamino aromatic compounds may be prepared by condensing an aromatic amine with a dihdropyran in the presence of a mercuric salt. Examples of aromatic amines which may be used in this invention include aniline, o-toluidine, m-toluidine, p-toluidine, o-ethylaniline, m-ethylaniline, p-ethylaniline, o-propylaniline, m-propylaniline, p-propylaniline, o-isopropylaniline, m-isopropylaniline, p-isopropylaniline, the isomeric butyl-, amyl-, and hexylanilines, etc., o-aminophenol, m-aminophenol, p-aminophenol, p-phenylenediamine, 4,4'-diaminodiphenylether, etc. It is to be understood that the aforementioned aromatic amines are only representatives of the class of amines which may be used and that the present process is not necessarily limited thereto.

The condensation between the aromatic amine and the dihydropyran such as 2,3-dihydropyran is effected at sub-atmospheric temperatures usually in the range of from about 0° to about 20° C. and in the presence of a mercuric salt catalyst. Examples of mercuric salts which may be used as catalysts in this invention includes inorganic mercuric salts such as mercuric bromide, mercuric bromate, mercuric chloride, mercuric chlorate, mercuric chromate, mercuric fluoride, mercuric iodate, mercuric iodide, mercuric oxylate, mercuric nitrate, mercuric phosphate, mercuric sulfate, etc.; organic mercuric salts such as mercuric formate, mercuric acetate, mercuric propionate, etc. In addition, if so desired, the reaction or condensation may take place in a substantially inert organic diluent or solvent, said diluents including aromatic hydrocarbons such as benzene, toluene, o-xylene, m-xylene, p-xylene, ethylbenzene, etc.; paraffin hydrocarbons such as n-pentane, n-hexane, n-heptane, methylcyclopentane, methylcyclohexane, etc.; ethers such as dimethyl ether, diethyl ether, dipropyl ether, etc.; dioxane, etc.

The present process may be effected in any suitable manner and may comprise either a batch or a continuous type operation. For example, when a batch type operation is used a quantity of the dihydropyran and the aromatic amine in an inert organic diluent of the type hereinbefore set forth along with a catalytic amount of mercuric salt is placed in an appropriate apparatus which is provided with cooling means such as an ice bath. The apparatus is sealed and the reaction is allowed to proceed at a predetermined sub-atmospheric temperature for the desired residence time, at the end of which time the apparatus and contents thereof are allowed to warm to room temperature. The desired reaction product is separated from the catalyst and unreacted starting materials by conventional means such as fractional distillation, crystallization, etc.

The reaction of the present invention may also be effected in a continuous type operation. A particularly desirable type of operation for this reaction comprises a fixed bed process in which the catalyst comprising the mercuric salt is disposed as a fixed bed in a reaction zone which is maintained at the proper operating conditions of temperature and pressure and which may comprise an unpacked vessel or coil or which may be lined with an adsorbent packing material such as dehydrated bauxite, alumina, fire brick and the like. The starting materials comprising the aromatic amine and the dihydropyran are continuously charged to the reaction zone through separate lines or, if so desired, they may be admixed prior to entry into said reaction zone and charged thereto in a single stream. The inert organic diluent, if one is used, is also continuously charged to the reactor through a separate line, or if so desired, may be admixed with one or both of the starting materials and charged to said reactor in a single line.

Other continuous types of operation which may be used is the moving bed type in which the catalyst and the reactants pass either concurrently or countercurrently to each other in a moving stream and the slurry type operation in which the catalyst is carried into the reaction zone as a slurry in one of the starting materials. In each of the aforementioned continuous type processes the reaction product is continuously withdrawn from the zone, separated from the reactor effluent, and recovered by conventional means hereinbefore set forth, while the effluent is recycled to said zone to form a portion of the starting materials.

The following examples are given to illustrate the process of the present invention, which, however, are not intended to limit the generally broad scope of the present invention in strict accordance therewith.

*Example I*

A mixture of 10.8 g. (0.1 mole) of phenylene-diamine and 19.2 g. (0.2 mole) of 2,3-dihydropyran in 100 cc. of an organic diluent comprising dioxane and 1.0 g. of mercuric acetate was placed in a flask. The flask was immersed in an ice bath and maintained at a temperature of approximately 0° C. The condensation was allowed to proceed for a period of approximately 6 hours, at the end of which time the flask and contents thereof were allowed to warm to room temperature. The reaction product was separated from the catalyst, washed with 10% sodium hydroxide and dried. The desired product, comprising N,N'-di-(2-tetrahydropyranyl)-p-phenylenediamine was separated and recovered. This product had a neutralization equivalent of 138; calculated for $C_{16}H_{24}N_2O_2$, 140.

*Example II*

A mixture of 20 g. (0.1 mole) of 4,4'-diamino-diphenylether and 19.2 g. (0.2 mole) of 2,3-dihydropyran in 100 cc. of dioxane is placed in a flask along with 1.0 g. of mercuric acetate. The flask is provided with an ice bath which is maintained at a temperature at approximately 0° C. The reaction is allowed to proceed for a period of approximately 4 hours, at the end of which time the flask and contents thereof are allowed to warm to room temperature. The reaction product is separated from the catalyst, washed with water, dried and subjected to fractional distillation under reduced pressure. The desired reaction product, consisting of 4,4'-di-(2-tetrahydropyranylamino)-diphenyl ether, is separated and recovered.

*Example III*

A mixture of 9.2 g. (0.1 mole) of aniline and 19.2 g. (0.2 mole) of 2,3-dihydropyran was placed in a flask along with 1.0 g. of mercuric nitrate in 100 cc. of dioxane. The flask was immersed in an ice bath which cooled the temperature of the flask to approximately 0° C. The reaction was allowed to proceed for a period of approximately 2 hours, at the end of which time the flask and contents thereof were allowed to warm to room temperature. The reaction product was washed with 10% sodium hydroxide, dried and subjected to fractional distillation under reduced pressure, the desired product, comprising N-(2-tetrahydropyranyl)aniline, boiling at 120°–124° C. at 1–2 mm. pressure, being recovered therefrom. This product was subjected to analysis with the following results:

Found: C, 74.5; H, 8.5; N, 7.9; O, 9.0. Calc. for: $C_{11}H_{15}NO$: C, 74.7; H, 8.5; N, 7.9; O, 9.0.

*Example IV*

A mixture of 10.8 g. of p-aminophenol and 19.2 g. of 2,3-dihydropyran dissolved in 50 cc. of dioxane and 1.0 g. of the mercuric salt catalyst comprising mercuric sulfate was placed in a flask and subjected to the same treatment as set forth in Examples I and II above. The desired product, comprising N-(2-tetrahydropyranyl)-p-aminophenol is recovered thereby.

*Example V*

A mixture of 10.7 g. of p-toluidine and 19.2 g. of 2,3-dihydropyran dissolved in 50 cc. of dioxane and 1.0 g. of the mercuric salt catalyst comprising mercuric oxalate is placed in a flask and subjected to the same treatment as set forth in Examples I and II above. The desired product, comprising N-(2-tetrahydropyranyl)-p-toluidine is recovered thereby.

I claim as my invention:

1. A process which comprises condensing carbocyclic aromatic amine with 2,3-dihydropyran in the presence of a mercuric salt, and recovering the resultant condensation product.

2. A process which comprises condensing carbocyclic aromatic amine with 2,3-dihydropyran in the presence of a mercuric salt at a temperature of from about 0° to about 20° C., and recovering the resultant condensation product.

3. A process which comprises condensing carbocyclic aromatic amine with 2,3-dihydropyran in an inert organic diluent in the presence of a mercuric salt at a temperature of from about 0° C. to about 20° C., and recovering the resultant condensation product.

4. A process which comprises condensing carbocyclic aromatic amine with 2,3-dihydropyran in the presence of mercuric acetate at a temperature of from about 0° to about 20° C., and recovering the resultant condensation product.

5. A process which comprises condensing carbocyclic aromatic amine with 2,3-dihydropyran in the presence of mercuric chloride at a temperature of from about 0° to about 20° C., and recovering the resultant condensation product.

6. A process which comprises condensing carbocyclic aromatic amine with 2,3-dihydropyran in the presence of mercuric nitrate at a temperature of from about 0° to about 20° C., and recovering the resultant condensation product.

7. A process which comprises condensing carbocyclic aromatic amine with 2,3-dihydropyran in the presence of mercuric sulfate at a temperature of from about 0° to about 20° C., and recovering the resultant condensation product.

8. A process which comprises condensing carbocyclic aromatic amine with 2,3-dihydropyran in the presence of mercuric formate at a temperature of from about 0° to about 20° C., and recovering the resultant condensation product.

9. A process which comprises condensing p-phenylenediamine with 2,3-dihydropyran in the presence of mercuric acetate at a temperature in the range of from about 0° to about 20° C., and recovering the resultant N,N'-di-(2-tetrahydropyranyl)-p-phenylenediamine.

10. A process which comprises condensing 4,4'-diaminodiphenyl ether with 2,3-dihydropyran in the presence of mercuric acetate at a temperautre in the range of from about 0° to about 20° C., and recovering the resultant 4,4-di-(2-tetrahydropyranyl-amino)-diphenyl ether.

11. A process which comprises condensing aniline with 2,3-dihydropyran in the presence of mercuric nitrate at a temperature in the range of from about 0° to about 20° C., and recovering the resultant N-(2-tetrahydropyranyl)aniline.

12. A process which comprises condensing p-aminophenol with 2,3-dihydropyran in the presence of mercuric sulfate at a temperature in the range of from about 0° to about 20° C., and recovering the resultant N-(2-tetrahydropyranyl)-p-aminophenol.

13. A process which comprises condensing p-toluidine with 2,3-dihydropyran in the presence of mercuric oxalate at a temperature in the range of from about 0° to about 20° C., and recovering the resultant N-(2-tetrahydropyranyl)-p-toluidine.

References Cited in the file of this patent

Glacet: "Societe Chemique de France Bulletin," pp. 575–580, T21 (1954).